United States Patent [19]

Hufnagel

[11] Patent Number: 4,797,934
[45] Date of Patent: Jan. 10, 1989

[54] SPEAKER HEADREST

[76] Inventor: Fred M. Hufnagel, 11567 Ridge Rd., Nevada City, Calif. 95959

[21] Appl. No.: 90,122

[22] Filed: Aug. 27, 1987

[51] Int. Cl.⁴ .................. H04R 1/02; A47C 7/36; A47C 7/38
[52] U.S. Cl. ..................... 381/188; 297/61; 297/220; 297/391; 297/398; 297/400; 297/401; 181/145; 381/24; 381/205
[58] Field of Search .............. 381/188, 205, 86–90, 381/182, 24; 297/247, 220, 221, 61, 397, 394, 398, 400, 401, 391; 181/141, 144, 145

[56] References Cited

U.S. PATENT DOCUMENTS

| 2,582,571 | 1/1952 | Thoma | 297/397 |
| 2,629,023 | 2/1953 | LaFitte | 381/151 |
| 3,230,320 | 1/1966 | Kerr | 381/183 |
| 3,512,605 | 5/1970 | McCorkle | 381/205 |
| 3,944,020 | 3/1976 | Brown | 381/205 |
| 4,027,112 | 5/1977 | Heppner et al. | 381/182 |

Primary Examiner—Jin F. Ng
Assistant Examiner—Danita R. Byrd
Attorney, Agent, or Firm—Flehr, Hohbach, Test, Albritton & Herbert

[57] ABSTRACT

A speaker headrest is composed of a frame and a concave front surface to support the user's head through a cushion and members flanking the frame and rotatably attached thereto. Speakers contained in these flanking members are pressed against the user's ears when the user's head is moved backward to rest against the frame, thereby pushing lever plates attached to the flanking members backwards and causing the flanking members to rotate around their supporting axes of rotation.

6 Claims, 3 Drawing Sheets

FIG.—1

SPEAKER HEADREST

BACKGROUND OF THE INVENTION

This invention relates to a speaker headrest and more particularly to a headrest which incorporates speakers and is attachable to dental chairs, automobile seats and the like.

Music is frequently played in the office of a dentist from a radio speaker to provide a soothing influence and to distract the patient's attention from the work being done. Since a program which may be pleasing to one person may not be pleasing at all and even annoying to persons in the vicinity, various headrests have been considered for a dental chair whereby the patient alone can hear the program. Examples of headrests for a dental chair are described, for example, in U.S. Pat. Nos. 2,629,023 and 3,230,320. Such headrests incorporating an earphone or a set of speakers can be useful in vehicles such as automobiles and airplanes. U.S. Pat. Nos. 3,512,605, 3,944,020 and 4,027,112, for example, disclose such headrests.

Although it is generally desirable to have the speakers pressed against the listener's ears such that the sound therefrom will reach only the listener, it is equally desirable that the user can easily remove the headrest. The prior art speaker headrests have not been totally satisfactory from these points of view.

SUMMARY OF THE INVENTION

It is therefore an object of the present invention to provide a speaker headrest which can be easily set to a dental chair or an automobile seat.

It is another object of the present invention to provide a speaker headrest which can give its user the joy of listening without annoying persons in the vicinity.

It is still another object of the present invention to provide a speaker headrest which can be disengaged automatically when the user's head is raised therefrom.

The above and other objects of the present invention are achieved by a speaker headrest of a novel design whereby a pair of wing members containing speakers flank a frame by which they are rotatably supported. Lever plates are attached to the wing members such that as the user's head is put in the resting position, they will be automatically pushed backward and this same force tends to press the parts of the wing members containing the speakers against the user's ears.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

A speaker headrest embodying the present invention is described below with reference simultaneously to FIG. 1 which is its front view when it is in a "closed" position and FIG. 2 which is its top view when it is in a partially "open" position. Basically, the headrest is comprised of a frame 12, a pair of wing members 15 and 16 flanking the frame 12 from both sides and rotatably attached thereto, and a pair of speakers 18 and 19 contained individually in these wing members 15 and 16. The frame 12 is a solid member made of a metallic or plastic material for supporting the left and right wing members 15 and 16 and also the head of the user. Thus, it has preferably a concave front surface with a radius of curvature of about 5 inches at the center as shown in FIG. 2 such that the user's head can be comfortably nested and can also be turned horizontally within a limited range. The back surface of the frame, on the other hand, may be made flat such that the headrest 10 can be stably placed on top of a bed with its front surface pointing upward and that the user can use it as a musical pillow although such embodiment of the frame 12 is not shown by a drawing.

Figure 1:
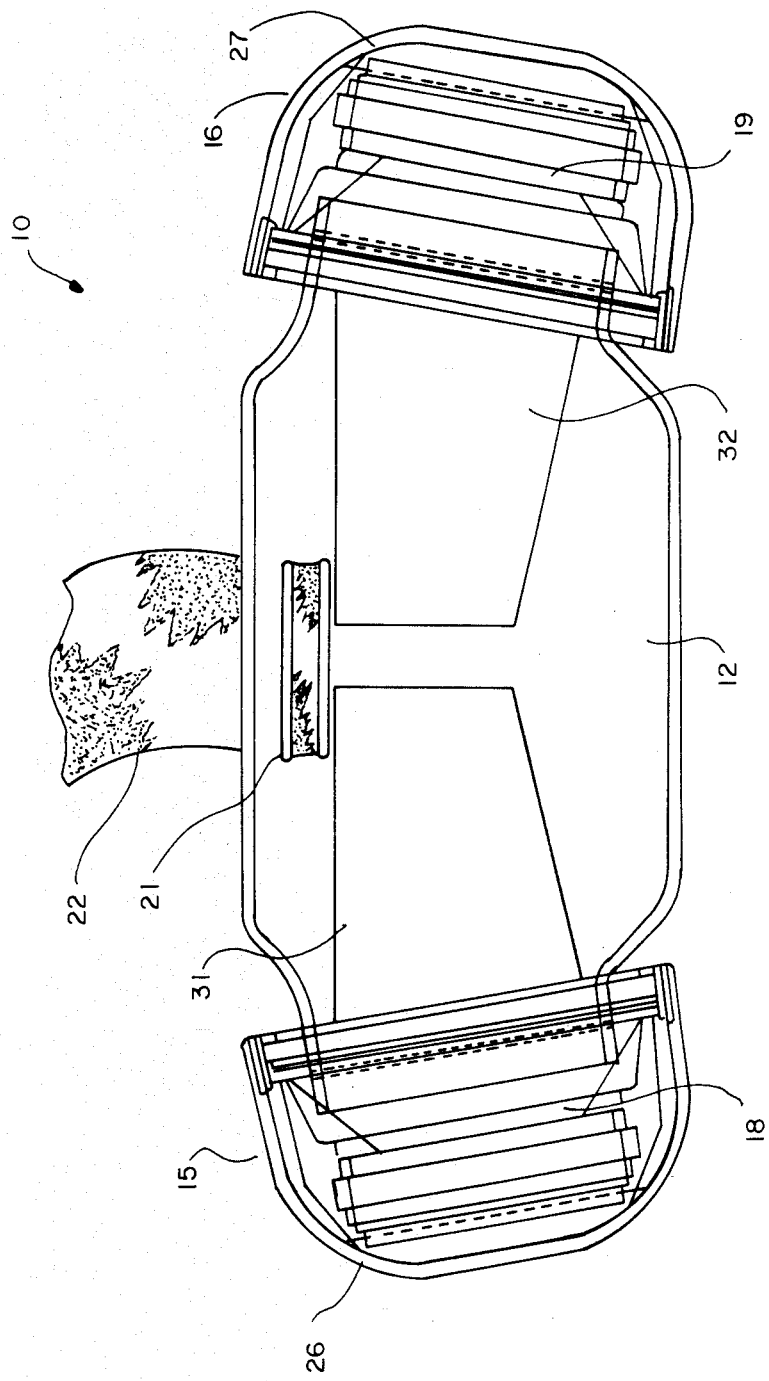
FIG. 1 is a front view of a speaker headrest embodying the present invention.
Figure 2:
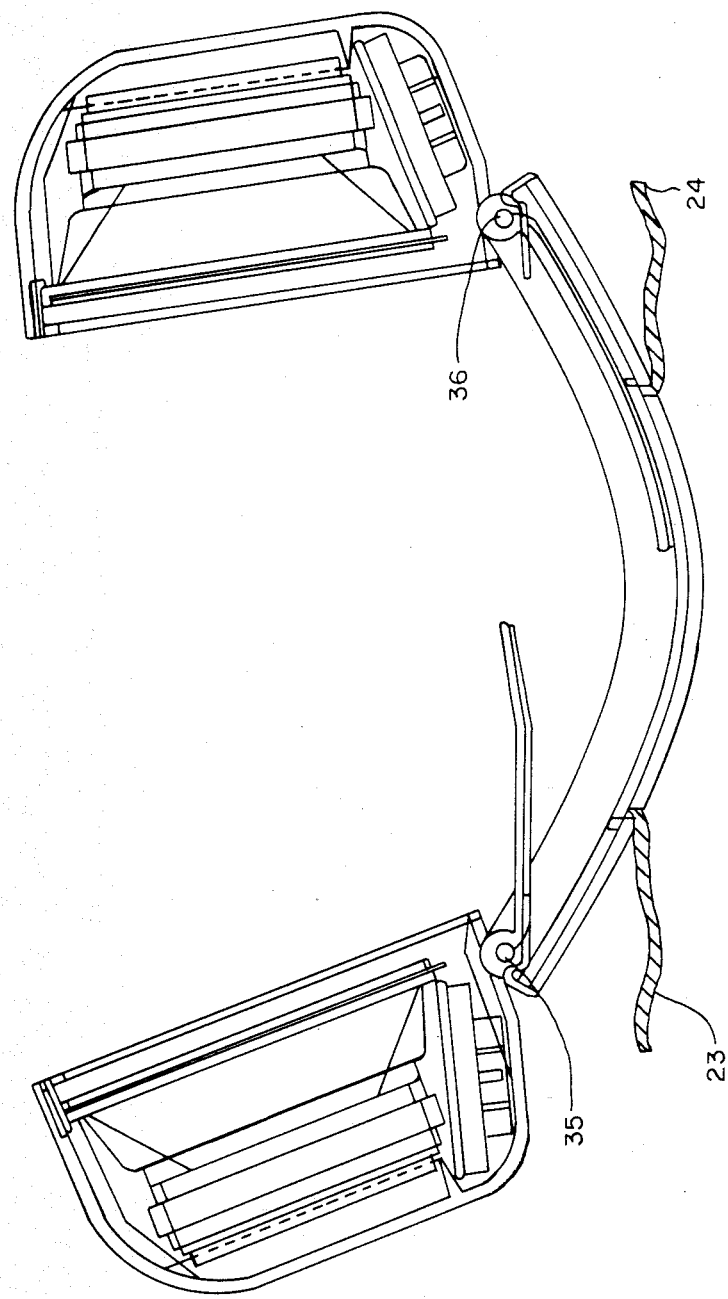
FIG. 2 is a top view of the speaker headrest of FIG. 1.

As shown in FIG. 1, the frame 12 is provided with elongated openings 21 for anchoring a strap 22. Additional openings are provided at both sides, although not visible in FIG. 1 or 2, to similarly anchor straps 23 and 24 shown in FIG. 2. These straps 22, 23 and 24 are provided for the purpose of securing the headrest 10 removably to a dental chair, an automobile seat or the like. Thus, they may be attached to the frame 12 securely or in an adjustable manner as seat belts are secured to an automobile body. According to a preferable embodiment, the straps 22, 23 and 24 may be provided with adhesive pieces such as Velcro TM tabs by means of which they can be adjustably fastened with repsect to one another. No particular manner of securing the straps 22, 23 and 24 to the frame 12 or the headrest 10 to a fixture, however, is intended to limit the scope of the present invention.

The speaker-containing wing members 15 and 16 are structured symmetrically with respect to each other and attached symmetrically to the left-hand and right-hand ends of the frame 12, respectively. The wing members 15 and 16 are each provided with a box-like housing structure 26 or 27 for the speaker 18 or 19 therein and a lever plate 31 or 32. The wing members 15 and 16 are hingeably attached to the frame 12 and supported thereby rotatably around axes 35 and 36 which are not parallel but slightly tilted towards each other. The angle between these axes 35 and 36 is approximately 20°. The weight distribution of the wing members 15 and 16 inclusive of the speakers 18 and 19 contained therein, or their centers of mass, is such with respect to these axes 35 and 36 that they tend to open naturally by the force of gravity if no other force is applied while the headrest 10 is so positioned that the front surface of the frame 12 is substantially vertical. The housing structures 26 and 27 are made relatively bulky for the purpose of sound-proofing and also such that the dentist for the user-patient can use them as support and rest instead of the patient's face.

The lever plates 31 and 32 are either unistructurally formed with the housing structures 26 and 27 or solidly attached thereto such that they rotate together around the respective axes 35 and 36. The lever plates 31 and 32 extend generally towards each other such that as the user's head is rested thereon and they are thereby pushed towards the front surface of the frame 12, the wing members 15 and 16 are rotated around the axes 35 and 36 and the housing structures 26 and 27 will move forward, until they assume an above-referenced "closed" position, pressing the speakers 18 and 19 against the user's ears. Thus, the lever plates 31 and 32 are flat pieces which will be substantially parallel to the front surface of the frame 12 as shown in FIG. 2 when they are pushed toward it.

In summary, the headrest 10 of the present invention is so structured that when the user's head is moved backward and rested against the front surface of the frame 12, the head automatically pushes the lever plates 31 and 32 backward towards the front surface of the frame 12, thereby causing the wing members 15 and 16 to rotate around their respective axes 35 and 36 and the speakers 18 and 19 to be pressed against the ears. When the user wishes to be freed, on the other hand, all that is needed is to move the head forward. Since the wing members 15 and 16 are so designed as to be under the influence of gravitational biasing forces which tend to move the members 15 and 16 to an "open" position, the wing members 15 and 16 will automatically swing outward away from the user's ears as soon as the user's head is moved forward from the resting position against the front surface of the frame 12.

Figure 3:
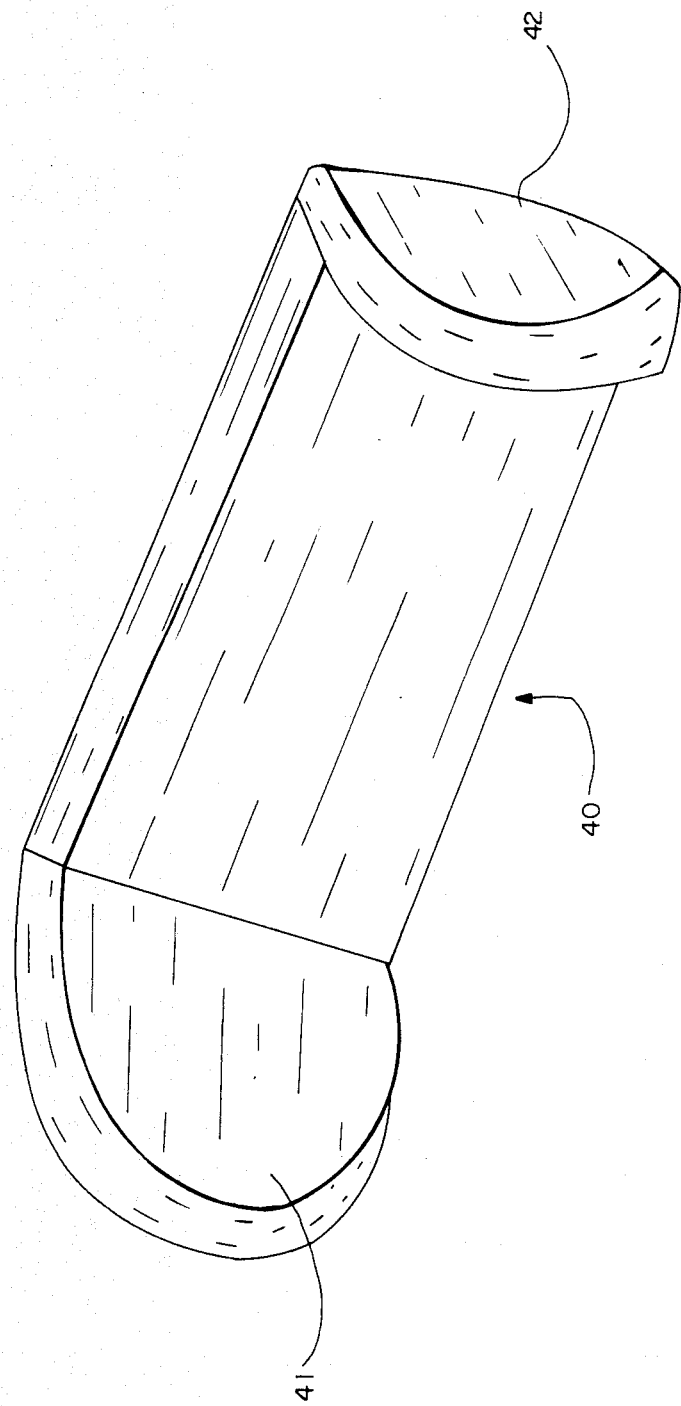
FIG. 3 is a drawing schematically showing an external view of a cushion adapted to be attached to the speaker headset of FIGS. 1 and 2.

Although not shown in FIGS. 1 and 2 for the convenience of explanation, the headrest 10 of the present invention is further provided with a cushion 40 of FIG. 3 made of a foam material having openings to provide for the speaker sound and covered by a two-way stretch material such as Lycra TM. A thin aluminum backing (not shown) is also provided to maintain its shape with two side sections 41 and 42 for covering the user's ears opposite the speakers 18 and 19. Velcro TM tabs or any such adhesive pieces are attached on the back surface of the side sections 41 and 42 as well as corresponding surface areas of the speaker housing structures 26 and 27 for removably attaching the cushion 40 to the headrest 10. When the cushion 40 is thus attached to the housing structures 26 and 27, the center section of the cushion 40 tends to limit the motion of the lever plates 31 and 32, allowing the speaker housing structures 26 and 27 to move outward only slightly but enough to allow the user's head to be freed and moved forward.

The foregoing description of a preferred embodiment of the invention has been presented for purposes of illustration and description. It is not intended to be exhaustive or to limit the invention to the precise form disclosed, and many modifications and variations are possible in light of the above teaching. For example, biasing means such as springs may be provided at the axes 35 and 36 to provide the aforementioned biasing forces which would tend to move the speaker housing structures 26 and 27 away from the user's ears when the user's head is moved forward from the resting position and no backward force is applied to the lever plates 31 and 32 towards the front surface of the frame 12. Any modifications and variations that may be apparent to a person skilled in the art are intended to be included within the scope of this invention.

What is claimed is:

1. A speaker headrest comprising
a frame having a front surface for supporting a user's head, and
a pair of members flanking said frame, each of said flanking members having a housing structure containing speakers and a lever plate and being connected to said frame rotatably around an axis such that said flanking members swing around said axes to hold said speakers against the user's head as said lever plates are pushed toward said front surface of said frame.

2. The speaker headrest of claim 1 wherein said axes make an angle therebetween.

3. The speaker headrest of claim 2 wherein said angle is approximately 20°.

4. The speaker headrest of claim 1 wherein said front surface of said frame is concave.

5. The speaker headrest of claim 1 further comprising strapping means attached to said frame for mounting said headrest onto a piece of furniture or the like.

6. The speaker headrest of claim 1 further comprising a cushion removably attachable to said housing structures.

* * * * *